United States Patent [19]
Andre

[11] Patent Number: 5,980,670
[45] Date of Patent: Nov. 9, 1999

[54] METHOD OF FORMING A METAL PIPE WITH CUFF FOR FORMING PIPE JOINT

[75] Inventor: James R. Andre, Newport Beach, Calif.

[73] Assignee: Hall International, LLC, Newport Beach, Calif.

[21] Appl. No.: 08/989,547

[22] Filed: Dec. 12, 1997

[51] Int. Cl.⁶ .................................................. F16L 47/00
[52] U.S. Cl. .......................... 156/153; 138/109; 156/187; 156/188; 156/191; 156/244.13; 285/293.1
[58] Field of Search ..................................... 156/153, 187, 156/188, 191, 194, 244.11, 244.12, 244.13; 138/109; 285/293.1

[56] References Cited

U.S. PATENT DOCUMENTS

| | | |
|---|---|---|
| 127,438 | 6/1872 | Stephens . |
| 192,079 | 6/1877 | Noble . |
| 848,238 | 3/1907 | Greenfield . |
| 887,084 | 5/1908 | Fulton . |
| 901,534 | 10/1908 | Hamlin . |
| 907,136 | 12/1908 | Farrington et al. . |
| 925,317 | 6/1909 | Eldred . |
| 1,049,544 | 1/1913 | Smith . |
| 1,263,340 | 4/1918 | Silk . |
| 1,270,579 | 6/1918 | Witzenmann . |
| 1,340,818 | 5/1920 | Brinkman . |
| 1,453,220 | 4/1923 | Witzenmann . |
| 1,570,886 | 1/1926 | Fulton et al. . |
| 1,644,823 | 10/1927 | Fay . |
| 1,677,523 | 7/1928 | Herbst et al. . |
| 1,718,468 | 6/1929 | Leary . |
| 1,761,034 | 6/1930 | Gillett . |
| 1,806,920 | 5/1931 | See . |
| 1,885,587 | 11/1932 | Burton . |
| 2,022,694 | 12/1935 | Stone . |
| 2,068,022 | 1/1937 | Hammel . |
| 2,094,691 | 10/1937 | Williams . |
| 2,118,060 | 5/1938 | Stone et al. . |
| 2,125,447 | 8/1938 | Jacobson . |
| 2,180,091 | 11/1939 | Norton et al. . |
| 2,330,966 | 10/1943 | Gottwald et al. . |
| 2,417,676 | 3/1947 | Chernack . |
| 2,686,747 | 8/1954 | Wurtz et al. . |
| 2,713,381 | 7/1955 | Seck . |
| 2,739,089 | 3/1956 | Hageltorn . |
| 2,758,366 | 8/1956 | Voetelink . |
| 2,841,183 | 7/1958 | Rejeski . |
| 2,859,061 | 11/1958 | Reid . |
| 2,898,634 | 8/1959 | Alderfer . |
| 2,915,110 | 12/1959 | Ferguson et al. . |
| 3,085,596 | 4/1963 | Rejeski . |
| 3,126,306 | 3/1964 | Sherman . |
| 3,199,541 | 8/1965 | Richitelli . |
| 3,219,368 | 11/1965 | Crumpler . |

(List continued on next page.)

FOREIGN PATENT DOCUMENTS

| | | |
|---|---|---|
| 111100 | 4/1939 | Australia . |
| 522825 | 10/1953 | Belgium . |
| 1190871 | 7/1985 | Canada . |
| 1055363 | 2/1954 | France . |
| 1075364 | 10/1954 | France . |
| 543926 | 8/1933 | Germany . |
| 55-51526 | 4/1980 | Japan . |
| 42213 | 10/1939 | Switzerland . |
| 1066864 | 4/1967 | United Kingdom . |
| 1212221 | 11/1970 | United Kingdom . |
| 8201757 | 5/1982 | WIPO . |

Primary Examiner—Jeff H. Aftergut
Attorney, Agent, or Firm—Stetina Brunda Garred & Brucker

[57] ABSTRACT

A method of forming a cuff on a section of tubular pipe which defines first and second ends and inner and outer surfaces. The method comprises the initial step of applying an outer layer of polymer material to a portion of the outer surface of the pipe such that a portion of the outer layer extends beyond and covers the first end of the pipe. Thereafter, an inner layer of polymer material is applied to a portion of the inner surface of the pipe. The inner layer is then blended into the outer layer so as to define a bull nose of the cuff which extends beyond the first end of the pipe.

20 Claims, 4 Drawing Sheets

U.S. PATENT DOCUMENTS

| | | |
|---|---|---|
| 3,224,814 | 12/1965 | Fisher . |
| 3,240,177 | 3/1966 | Habdas . |
| 3,247,692 | 4/1966 | Davis . |
| 3,255,516 | 6/1966 | Sommer . |
| 3,273,600 | 9/1966 | Swan . |
| 3,286,341 | 11/1966 | Miller . |
| 3,330,303 | 7/1967 | Fochler . |
| 3,331,400 | 7/1967 | Vilkaitis . |
| 3,422,856 | 1/1969 | Hunter et al. . |
| 3,435,852 | 4/1969 | Trihey . |
| 3,442,297 | 5/1969 | Wesesku . |
| 3,455,584 | 7/1969 | Henrickson . |
| 3,474,514 | 10/1969 | Lombardi . |
| 3,478,770 | 11/1969 | Osborn et al. . |
| 3,491,825 | 1/1970 | Peterson et al. . |
| 3,550,639 | 12/1970 | Okuda . |
| 3,572,394 | 3/1971 | Davis . |
| 3,621,884 | 11/1971 | Trihey . |
| 3,637,224 | 1/1972 | Triplett et al. . |
| 3,656,514 | 4/1972 | Kafka . |
| 3,721,597 | 3/1973 | Colburn . |
| 3,722,075 | 3/1973 | Fay . |
| 3,731,711 | 5/1973 | Bauer . |
| 3,809,223 | 5/1974 | Kendall . |
| 3,834,009 | 9/1974 | Iida et al. . |
| 3,865,146 | 2/1975 | Meserole . |
| 3,868,433 | 2/1975 | Bartz et al. . |
| 3,872,893 | 3/1975 | Roberts . |
| 3,877,136 | 4/1975 | Groch et al. . |
| 4,029,129 | 6/1977 | Harper . |
| 4,121,624 | 10/1978 | Chen . |
| 4,129,152 | 12/1978 | Davis . |
| 4,161,194 | 7/1979 | Nyssen . |
| 4,161,811 | 7/1979 | Nyssen . |
| 4,167,645 | 9/1979 | Carey . |
| 4,304,266 | 12/1981 | Kutnyak et al. . |
| 4,326,561 | 4/1982 | Kutnyak . |
| 4,333,221 | 6/1982 | Hayashi . |
| 4,337,800 | 7/1982 | Carlson et al. . |
| 4,355,448 | 10/1982 | Ezaki . |
| 4,360,227 | 11/1982 | Bridges . |
| 4,383,555 | 5/1983 | Finley . |
| 4,420,019 | 12/1983 | Dillion . |
| 4,443,019 | 4/1984 | Ishido et al. . |
| 4,472,475 | 9/1984 | Decroix . |
| 4,509,560 | 4/1985 | Schafer . |
| 4,575,400 | 3/1986 | Ueda et al. . |
| 4,606,953 | 8/1986 | Suzuki et al. . |
| 4,630,650 | 12/1986 | Davis . |
| 4,689,174 | 8/1987 | Lupke . |
| 4,715,609 | 12/1987 | Mino et al. . |
| 4,763,830 | 8/1988 | Davis . |
| 4,790,686 | 12/1988 | Christ et al. . |
| 4,791,800 | 12/1988 | Alexander . |
| 4,830,898 | 5/1989 | Smith . |
| 4,838,317 | 6/1989 | Andre et al. . |
| 4,852,616 | 8/1989 | Holcomb . |
| 4,865,210 | 9/1989 | Brainard, II . |
| 4,926,909 | 5/1990 | Salinas . |
| 4,964,440 | 10/1990 | Andre et al. . |
| 5,046,531 | 9/1991 | Kanao . |
| 5,300,336 | 4/1994 | Wong et al. . |
| 5,316,606 | 5/1994 | Andre . |
| 5,356,679 | 10/1994 | Houis et al. . |
| 5,411,619 | 5/1995 | Sundqvist et al. ............... 156/187 |
| 5,429,397 | 7/1995 | Kanao ............................ 138/109 |
| 5,454,402 | 10/1995 | Andre et al. . |

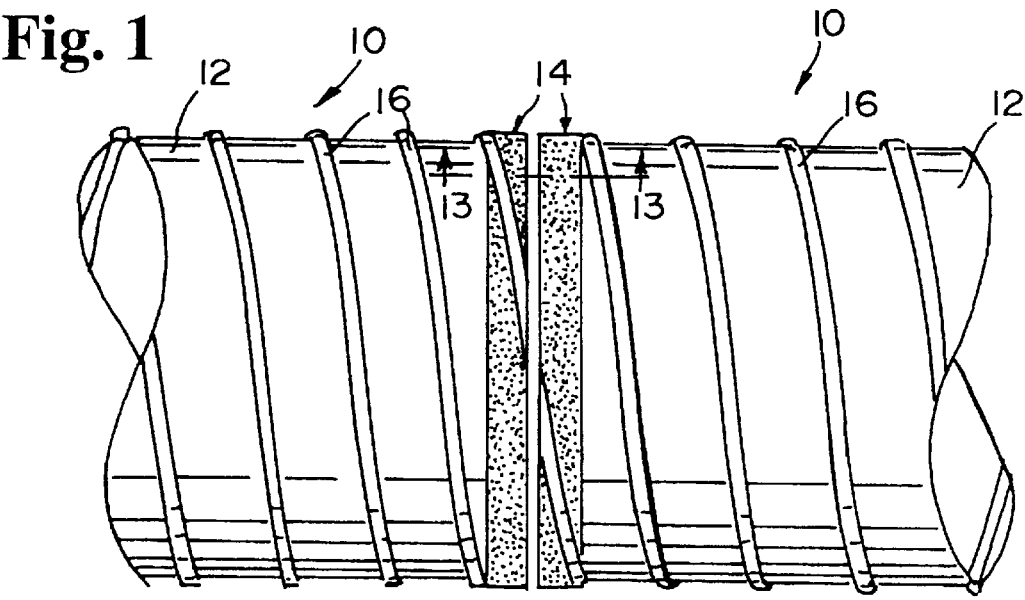
Fig. 1
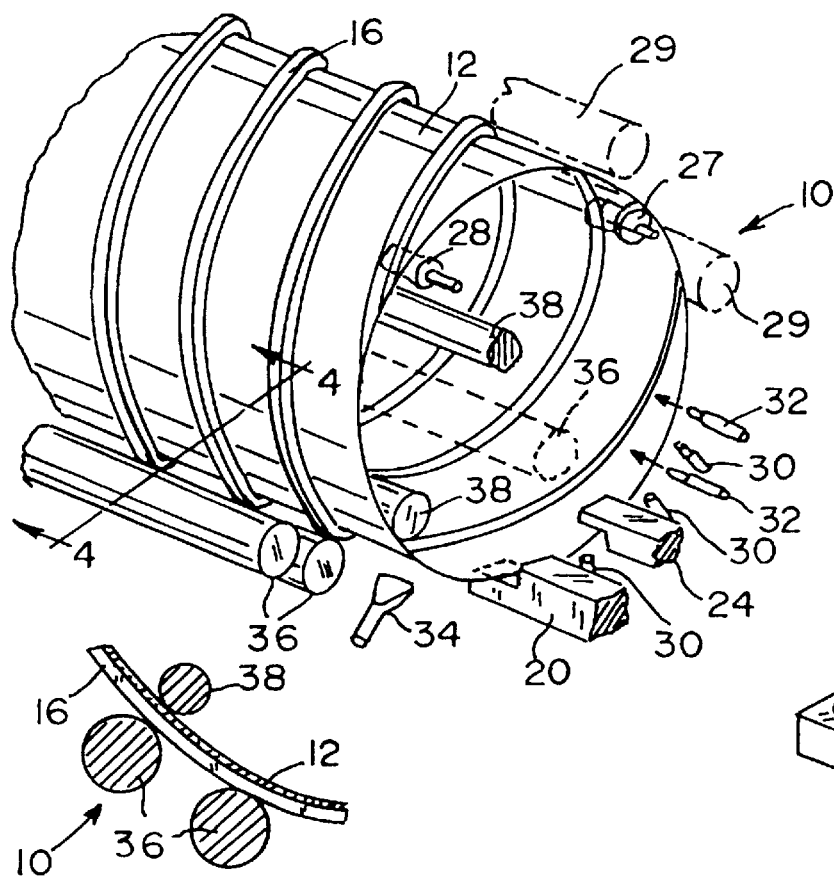
Fig. 2
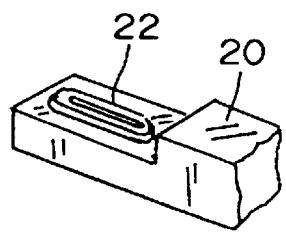
Fig. 3
Fig. 4

Fig. 13
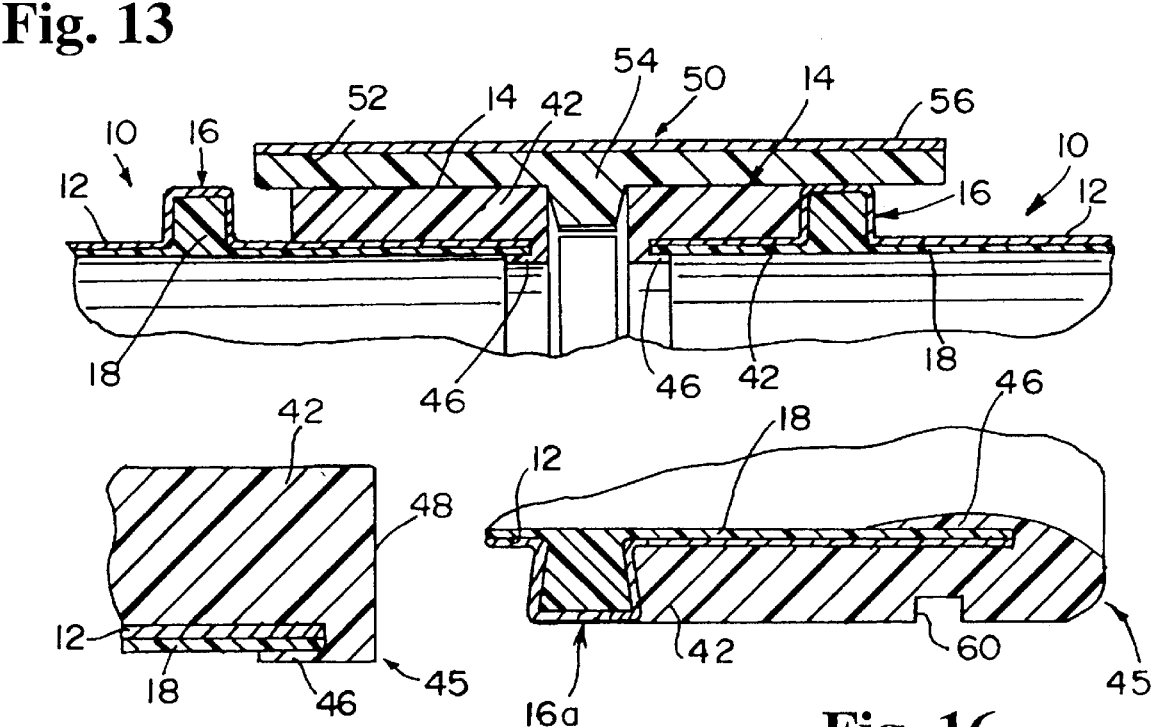
Fig. 14
Fig. 16
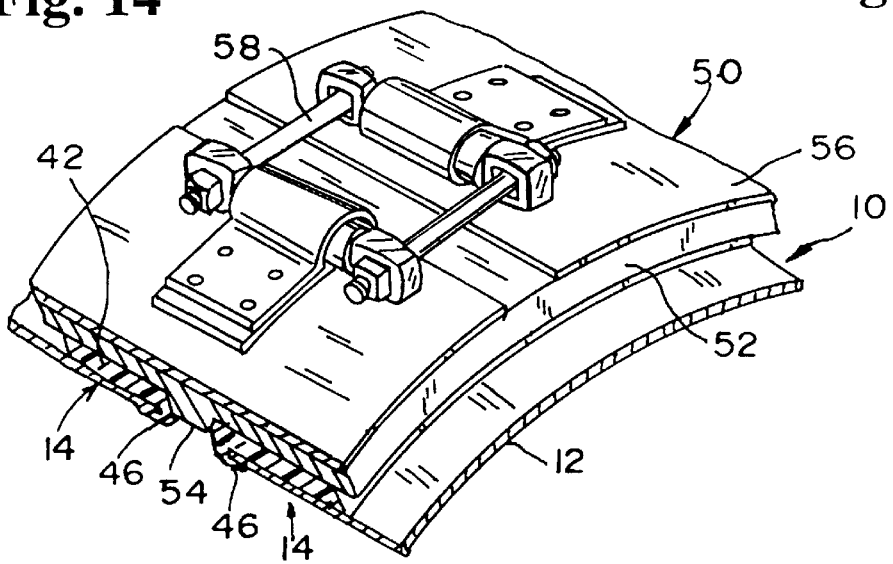
Fig. 15

METHOD OF FORMING A METAL PIPE WITH CUFF FOR FORMING PIPE JOINT

FIELD OF THE INVENTION

The present invention relates generally to pipe for use in sewers, storm drains, culverts and other low head applications, and more particularly to pipe adapted for use in corrosive and abrasive environments and including an integrally formed cuff for forming a fluid-tight pipe joint which is less susceptible to leakage and resistant to corrosive or abrasive degradation.

BACKGROUND OF THE INVENTION

Metal pipe of a both corrugated and spiral rib design is widely used for drainage, culverts, and other similar fluid conduits. Although susceptible to abrasion and corrosion, metal (e.g., steel) pipe has advantages over concrete pipe and the like due to its comparatively high strength and low weight. These characteristic render metal pipe relatively inexpensive to manufacture, ship, and handle, while permitting its use in applications requiring it to support substantial soil overburden. Applicant has previously introduced a particular spiral ribbed steel pipe into the marketplace having a hydraulic efficiency comparable to more costly concrete pipe and possessing superior structural capabilities for prolonged use in buried storm drain applications.

Since metal pipe is susceptible to corrosion and excessive abrasion, it use has previously been restricted primarily to culvert and storm drain applications. In sanitary applications (e.g., sewer systems), corrosion causing sulfuric acid is formed from hydrogen sulfide gas generated by waste products. Such waste products and/or acid has rendered the use of metal pipe in sanitary applications impractical since it rapidly deteriorates in the corrosive environment. As such, much heavier and more expensive concrete, lined concrete, and/or vitreous clay pipe has traditionally been utilized for sanitary applications. Thus, although metal pipe is generally preferred because of its high strength and comparatively low weight and cost, it has heretofore not been widely used in sanitary applications due to its susceptibility to corrosion.

Though often used in storm drain applications, metal pipe is nonetheless susceptible to extensive abrasion caused by the movement of gravel, dirt, sand, etc. therethrough. Such excessive abrasion frequently degrades the metal pipe to a point where leakage therefrom becomes a major concern. Additionally, such abrasion may, in some instances, be sufficient to adversely affect the structural integrity of the pipe, and consequently result in the structural failure thereof when the soil overburden crushes a portion of the pipe, thereby effectively plugging the pipe and substantially reducing or eliminating flow therethrough.

In recognition of the advantages attendant to the use of metal pipe, Applicant has also developed and introduced into the marketplace a spiral ribbed metal pipe which is provided with an integrally formed polymer liner, thus allowing for the use of the metal pipe in relation to sanitary or sewer applications. The liner of this metal pipe of the Applicant is adapted to withstand the corrosive environment found in sanitary applications, as well as the abrasive environment found in storm drain applications. In addition to being provided with the corrosion/abrasion resistant liner, this metal pipe of the Applicant is also provided with an outer coating to protect the exterior thereof from the corrosive effects of long-term exposure to the burial environment. This metal pipe of the Applicant is more fully described in its U.S. Pat. No. 5,316,606 entitled METAL PIPE WITH INTEGRALLY FORMED LINER AND METHOD OF FABRICATING THE SAME issued May 31, 1994 and U.S. Pat. No. 5,480,505 entitled METHOD OF FABRICATING A STEEL PIPE WITH INTEGRALLY FORMED LINER issued Jan. 2, 1996, and U.S. application Ser. No. 08/504,774 entitled STEEL PIPE WITH INTEGRALLY FORMED LINER AND METHOD OF FABRICATING THE SAME filed Jul. 20, 1995 and application Ser. No. 08/866,812 entitled STEEL PIPE WITH INTEGRALLY FORMED LINER AND METHOD OF FABRICATING THE SAME filed May 30, 1997. The contents of the aforementioned pending applications and issued patents are incorporated herein by reference.

Though Applicant's lined metal pipe overcomes the problems associated with corrosive or abrasive degradation when such pipe is used in sanitary or storm drain applications, problems are still encountered at the joints between adjacent sections of such pipe, particularly when used in sanitary applications. In this respect, when sections of the lined pipe are joined to each other in end-to-end fashion, the contact between the lining of the pipe sections is sometimes not fluid-tight, thus giving rise to the leakage of corrosive fluid therebetween. The lack of a fluid-tight seal between the pipe linings is often attributable to irregularities or flaws within those lined surfaces which are abutted against each other to form the joint. Also contributing to the difficulty in creating a fluid-tight seal between the pipe linings is the fact that the pipe walls to which the linings are integrally connected are often not perfectly round, thus causing the linings applied thereto to be out of round as well. As will be recognized, when one or both of the lining ends abutted against each other to form the joint are out of round, there is a greater susceptibility for occurrences of leakage therebetween. Moreover, the irregularities defined in the ends of the adjacent pipe sections attributable to the inclusion of the outwardly protruding spiral ribs gives rise to further difficulties in forming a fluid-tight joint therebetween.

The leakage of the corrosive fluids between the polymer pipe linings typically results in the exposure of the metal pipe walls adjacent the joints to such corrosive fluids and the resultant corrosion or degradation thereof. The corrosion of the metal pipe wall about the joint attributable to its exposure to the corrosive fluids causes a weakening of the joint which results in its eventual failure. The failure of the joint in turn results in large quantities of leakage of the corrosive fluids from within the conduit defined by the connected pipe sections.

As such, there exists a need in the art to provide pipe adapted for use in corrosive or abrasive environments with cuffs for use in forming leakage resistant joints between adjacent sections of the pipe. The present invention specifically addresses this need in the art.

SUMMARY OF THE INVENTION

In accordance with the present invention, there is provided a method of forming a cuff on a section of tubular pipe which defines opposed first and second ends and inner and outer surfaces. A cuff may be formed on either or both of the first and second ends of the pipe section, and is used to form part of a pipe joint, the remainder of which is formed by a cuff on the corresponding end of an adjacent pipe section and a fastening member such as an external coupling band which maintains the cuffs in firm engagement to each other. The cuff(s) are preferably formed upon sections of lined metal pipe, such as corrugated steel pipe or spiral rib steel pipe. However, those of ordinary skill in the art will recognize that the cuff(s) may be formed on one or both ends of a section of any type of pipe used for sewage, drainage, and similar applications, including plastic pipe, concrete pipe, and vitreous clay pipe.

The preferred method comprises the initial step of applying an outer layer of polymer material to a portion of the outer surface of the pipe such that a portion of the outer layer extends beyond and covers one end of the pipe. The outer layer is itself preferably formed from multiple sub-layers which are applied to the outer surface of the pipe in succession such that each successively applied sub-layer covers the previously applied sub-layer. The number of sub-layers included in the outer layer may vary, with two to ten sub-layers being preferred for the outer layer. The pipe is preferably pre-heated prior to the application of the initial sub-layer to the outer surface thereof, with each sub-layer itself being heated prior to the application of a successive sub-layer thereto. As the sub-layers are applied to the pipe in succession, at least one air jet is used to blow portions of each sub-layer over the end of the pipe such that the completely formed outer layer, in addition to being wrapped about a portion of the outer surface of the pipe, extends beyond and covers one end thereof. In addition to one air jet being used to blow each of the sub-layers over one end of the pipe, at least one additional air jet is used to spread the initially applied sub-layer over the outer surface of the pipe and adhere the same thereto, and to spread each successively applied sub-layer over the previously applied sub-layer. Subsequent to the application of the last sub-layer, at least one and preferably two or more outer forming rollers are used to smooth the outer layer and form the same with a substantially uniform outer diameter.

Subsequent to the application of the outer layer to the outer surface of the pipe, an inner layer of polymer material is applied to a portion of the inner surface of the pipe, and to that portion of the outer layer which extends beyond the end of the pipe. Immediately after its application, the inner layer is spread by at least one inner forming roller. Thereafter, the inner layer is blended into the outer layer so as to define a bull nose of the cuff which extends beyond the end of the pipe. The blending of the inner layer into the outer layer is preferably accomplished through the use of a blending roller.

In the preferred method, the outer and inner layers are applied to the outer and inner surfaces of the pipe via respective ones of a pair of extruder heads. The sub-layers forming the outer layer are preferably applied to the outer surface via an extruder head, with the inner layer also preferably being applied to the inner surface via an extruder head. The extruder heads as well as the blending roller are stationary, with the pipe being rotated relative thereto to facilitate the formation of the cuff thereon. As previously indicated, a cuff may be formed on either or both of the first and second ends of the pipe. The preferred polymer material for the outer and inner layers is polyethylene, though other materials possessing similar corrosion and abrasion resistant characteristics may be employed as an alternative to polyethylene. Prior to the application of the outer layer to the outer surface, a hydraulic jack(s) may optionally be inserted into the interior of the pipe to apply radially outwardly directed pressure to the inner surface thereof so that the pipe wall is as close to round as possible when the cuff is formed thereon.

Although not by way of limitation, the cuff forming method of the present invention is preferably carried out such that the bull nose of the cuff extends in the range of approximately 0.0625 to 1.0 inches beyond the end thereof. The preferred width of the outer layer (excluding the bull nose) is in the range of approximately 1.0 to 12.0 inches, with the preferred width of the inner layer (excluding the bull nose) being in the range of approximately 0.1 to 2.0 inches. The total width of the inner layer (including the bull nose) is preferably about 1.75 inches, with the total width of the outer layer (including the bull nose) preferably being in the range of about 1.0625 to 13.0 inches. The preferred thickness of the inner layer is in the range of about 0.01 to 0.2 inches, and preferably about 0.0625 inches. The thickness of the outer layer may vary according to the number of sub-layers used to form the outer layer. As such, the outer diameter of the cuff may be selectively increased or decreased by varying the number of sub-layers included in the outer layer.

In the preferred method, subsequent to a cuff being formed on either one or both ends of the pipe, each cuff is machined to provide it with a substantially uniform diameter, and to provide the bull nose with a substantially flat abutment shoulders at the outermost end thereof. The cuffs on corresponding ends of adjacent pipe sections may be joined directly to each other, with the firm engagement of the abutment shoulder against each other facilitating the formation of a fluid-tight seal therebetween. The integrity of such seal is increased by providing the cuffs with a substantially uniform diameter which maximizes the contact between the abutment shoulders. The firm engagement between the abutment shoulders is typically maintained by joining the cuffs to each other through the use of a sonic weld or a heat weld.

The cuffs may also be joined to each other through the use of an external fastening device such as a coupling band. When a coupling band is used to form the joint between the pipe sections, the abutment shoulders of the cuffs may be firmly seated against each other so as to form a fluid-tight seal therebetween, with the contact between the abutment shoulders being maintained by the coupling band. Alternatively, the abutment shoulders of the cuffs may be firmly seated against a portion of the coupling band itself in a manner forming a fluid-tight seal therebetween. In addition to or as an alternative to the abutment shoulder, each cuff may include an O-ring groove machined thereinto for accommodating an O-ring in the event the pipe section is to be joined to an adjacent pipe section through a bell and spigot connection. As will be recognized, any one of a variety of fastening or coupling techniques may be employed in relation to the cuffs on the corresponding ends of the adjacent pipe sections. In this respect, by forming the cuffs on the corresponding ends of the adjacent pipe sections, all customary coupling techniques may be employed to facilitate the attachment of the pipe sections to each other.

Further in accordance with the present invention, there is provided a pipe which comprises a tubular pipe wall defining opposed first and second ends and inner and outer surfaces. An outer layer of polymer material is applied to a portion of the outer surface of the pipe wall such that a portion of the outer layer extends beyond and covers one end of the pipe wall. Applied to a portion of the inner surface of the pipe wall is an inner layer of polymer material. The inner layer is blended into the outer layer such that the outer and inner layers collectively define a cuff having a bull nose which extends beyond the end of the pipe wall. The outer layer preferably comprises multiple sub-layers, and in particular two to ten sub-layers. Both the outer and inner layers are each preferably fabricated from polyethylene.

A cuff may be provided on one or both of the first and second ends of the pipe, with each cuff preferably being sized and configured to be of substantially uniform diameter, thus compensating for a pipe wall which is of non-uniform diameter. Additionally, the bull nose of each cuff may define a substantially flat abutment shoulder, with each cuff further optionally including a continuous O-ring groove formed therein. In this respect, each cuff may be configured to facilitate alternative coupling configurations, such as a bell and spigot connection.

BRIEF DESCRIPTION OF THE DRAWINGS

These, as well as other features of the present invention, will become more apparent upon reference to the drawings wherein:

FIG. 1 is a side elevational view of two adjacent sections of pipe which are each fabricated in accordance with the present invention to include a cuff for forming a fluid-tight joint therebetween;

FIG. 2 is a partial perspective view of the apparatus used to form the cuff on the pipe of the present invention;

FIG. 3 is a partial perspective view of one of the extruder heads of the apparatus shown in FIG. 2;

FIG. 4 is a cross-sectional view taken along line 4—4 of FIG. 2;

FIG. 13 is a cross-sectional view taken along line 13—13 of FIG. 1, illustrating a coupling which may be used to form the joint between adjacent sections of pipe fabricated in accordance with the present invention;

FIG. 14 is a partial cross-sectional view of the cuff of the pipe of the present invention, illustrating the cuff as being machined to be of generally uniform diameter and to define a substantially flat abutment shoulder;

FIG. 15 is a partial perspective view of the coupling shown in FIG. 13 for forming the joint between adjacent sections of pipe fabricated in accordance with the present invention; and FIG. 16 is a partial cross-sectional view of a pipe section including an alternative pipe wall.

DETAILED DESCRIPTION OF THE PREFERRED EMBODIMENT

Figure 5:
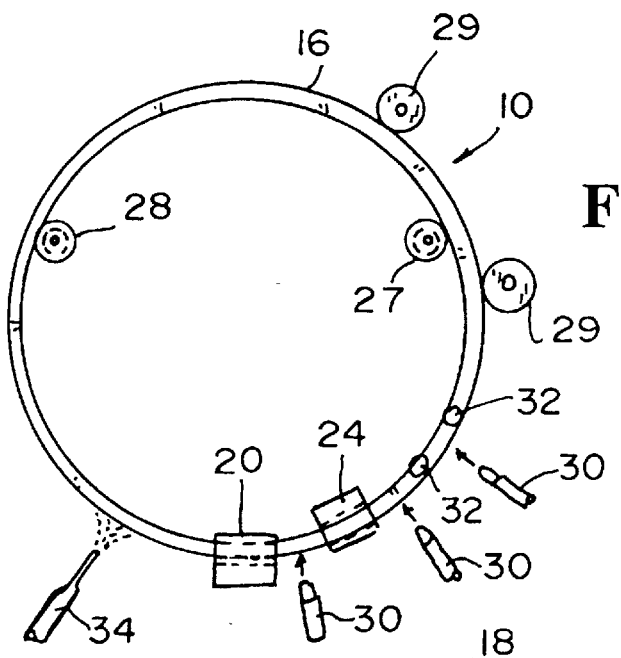
FIG. 5 is a front elevational view of the apparatus shown in FIG. 2.

Referring now to the drawings wherein the showings are for purposes of illustrating a preferred embodiment of the present invention only, and not for purposes of limiting the same, FIG. 1 illustrates the corresponding end portions of an adjacent pair of tubular pipe sections 10, each of which is fabricated in accordance with the present invention. Each of the pipe sections 10 includes a pipe wall 12 which defines opposed ends and inner and outer surfaces. Formed on one or both of the opposed ends of each of the pipe sections 10 is an annular cuff 14. When the pipe sections 10 are connected to each other in end-to-end fashion to define a fluid conduit for use in sanitary, storm drain, or other drainage applications, the firm engagement of the cuffs 14 on corresponding ends of the pipe sections 10 to each other or to a coupling device facilitates the formation of a fluid-tight seal therebetween. The manner of forming the cuff(s) 14 on each pipe section 10 as well as the techniques which may be used to firmly engage the cuffs 14 to each other to form the fluid-tight joint will be described in more detail below.

The pipe sections 10 of the present invention are preferably fabricated by forming the cuff(s) 14 on sections of lined metal pipe fabricated in accordance with the teachings of Applicant's above-identified pending applications and issues patents. In this respect, the pipe wall 12 is preferably fabricated from metal (i.e., steel), and includes an outwardly projecting spiral rib 16 formed thereon which extends between the opposed ends thereof. As seen in FIGS. 13 and 14, per the teachings of Applicant's above-identified pending applications and issued patents, the inner surface of the pipe wall 12 is covered by an integrally formed liner 18 which extends into the interior of the spiral rib 16. The liner 18 is adapted to withstand the corrosive environment found in sanitary applications, as well as the abrasive environment found in storm drain applications. In addition to being provided with the corrosion/abrasion resistant liner 18, the pipe wall 12 is also provided with a coating (not shown) upon the outer surface thereof which protects the exterior of the pipe wall 12 from the corrosive effects of long-term exposure to the burial environment. For purposes of clarity, subsequent references to the "outer surface" of the pipe wall 12 will mean the outer surface as defined by the coating provided on the exterior of the pipe wall 12, with references to the "inner surface" of the pipe wall 12 meaning the inner surface as defined by the liner 18 provided on the interior of the pipe wall 12.

Those of ordinary skill in the art will recognize that the pipe sections 10 of the present invention may be fabricated by forming the cuff(s) 14 on pipe other than for Applicant's lined spiral rib steel pipe. In this respect, the pipe sections 10 may comprise other types of metal pipe including corrugated steel pipe which include the cuff(s) 14 formed thereon, as well as plastic pipe, concrete pipe, and vitreous clay pipe.

Figure 9:
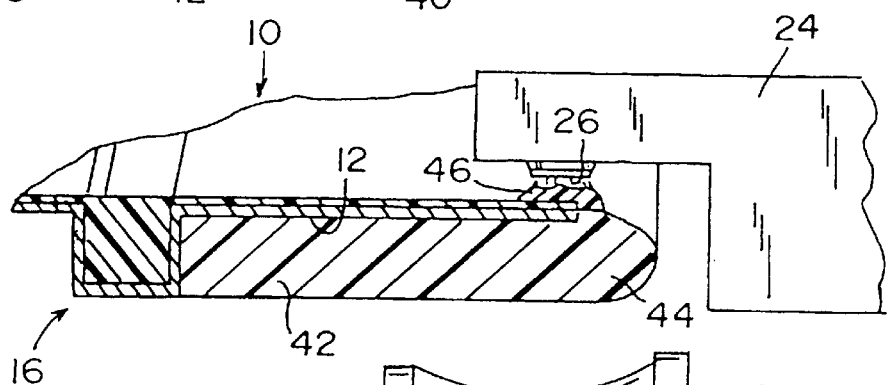

In accordance with the present invention, the cuff 14 is formed on one or both ends of the pipe wall 12 through the use of the cuff forming apparatus shown in FIGS. 2–5. The cuff forming apparatus comprises an outer extruder head 20 (shown in FIGS. 2, 3 and 5) which overlaps a portion of the outer surface of the pipe wall 12 adjacent one end thereof. The outer extruder head 20 is preferably a 3.75 inch extruder head and includes an outflow opening 22 disposed therein. As will be recognized, the outflow opening 22 is disposed within that portion of the outer extruder head 20 which overlaps the pipe wall 12. In addition to the outer extruder head 20, the cuff forming apparatus includes an inner extruder head 24 which is disposed in close proximity to the outer extruder head 20, and overlaps a portion of the inner surface of the pipe wall 12 adjacent the end which extends along the outer extruder head 20. The inner extruder head 24 preferably comprises a 1.25 inch extruder head and, as seen in FIG. 9, includes an outflow opening 26 disposed therein. As with the outflow opening 22 of the outer extruder head 20, the outflow opening 26 is disposed within that portion of the inner extruder head 24 which overlaps the inner surface of the pipe wall 12. As best seen in FIG. 5, the outer extruder head 20 is preferably oriented at approximately the six o'clock position relative to the pipe wall 12, with the inner extruder head 24 being oriented at approximately the five o'clock position relative to the pipe wall 12.

Figure 10:
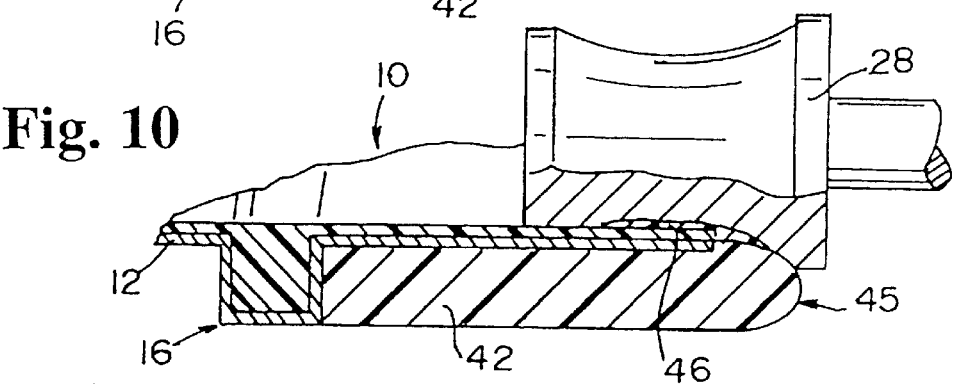

In addition to the outer and inner extruder heads 20, 24, the cuff forming apparatus comprises a rotatable inner forming roller 27 which overlaps a portion of the inner surface of the pipe wall 12 adjacent that end overlapped by the outer and inner extruder heads 20, 24. The inner forming roller 27 is preferably oriented at approximately the two o'clock position relative to the pipe wall 12. The cuff forming apparatus also comprises a rotatable blending roller 28 which, as seen in FIGS. 2, 5 and 10, contacts a portion of the inner surface of the pipe wall 12 adjacent that end overlapped by the outer and inner extruder heads 20, 24. A portion of the forming roller 28 extends beyond the end of the pipe wall 12, with the forming roller 28 preferably being oriented at approximately the ten o'clock position relative thereto. In addition to the inner forming and blending rollers 27, 28, the cuff forming apparatus includes a pair of rotatable outer forming rollers 29, each of which is spaced from and overlaps a portion of the outer surface of the pipe wall 12 adjacent the end thereof. The outer forming rollers 29 are themselves preferably oriented at approximately the one o'clock and three o'clock positions relative to the pipe wall 12.

Figure 7:
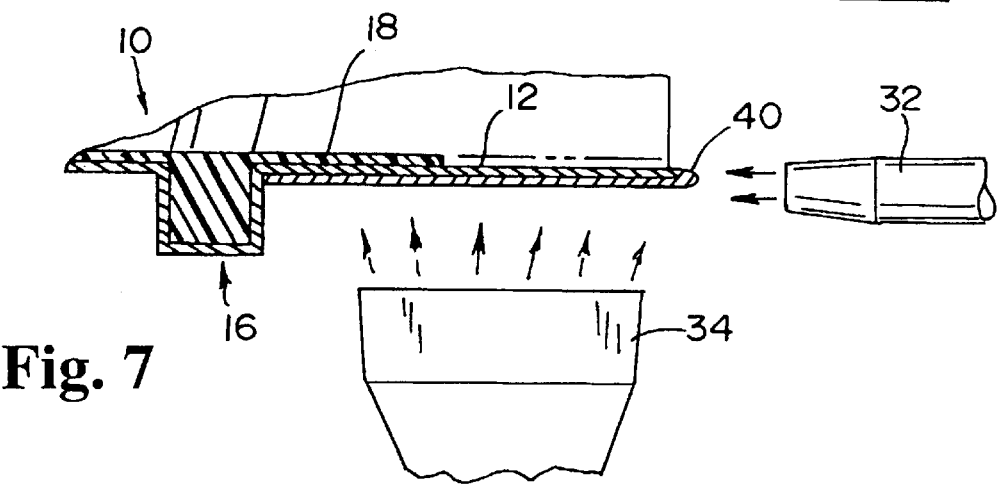

The cuff forming apparatus further comprises three (3) outer air jets 30 which are adapted to direct a high pressure air stream radially inwardly toward that portion of the outer surface of the pipe wall 12 adjacent the end which extends along the outer and inner extruder heads 22, 24, blending roller 28, and inner and outer forming rollers 27, 29. As seen in FIGS. 2 and 5, one of the air jets 30 is preferably located between the outer and inner extruder heads 20, 24. Of the remaining two air jets 30, one is preferably oriented at approximately the four o'clock position relative to the pipe wall 12, with the other air jet 30 being positioned between the inner extruder head 24 and that air jet 30 oriented at the four o'clock position. The cuff forming apparatus also includes a pair of inner air jets 32 which are adapted to direct a high pressure air stream inwardly toward the edge of the pipe wall 12 which defines the end thereof extending along the outer and inner extruder heads 20, 24, blending roller 28, inner and outer forming rollers 27, 29, and air jets 30. In this respect, as seen in FIGS. 2, 5 and 7, the air stream generated by the air jets 32 travels in a direction which is substantially parallel to the axis of the tubular pipe wall 12, in contrast to the direction of the air streams generated by the air jets 30 which travel radially inwardly toward the axis of the pipe wall 12. As best seen in FIG. 5, the air jets 32 are preferably located on opposite sides of and equidistantly spaced from the axis of travel of the air stream generated by the air jet 30 oriented at approximately the four o'clock position relative to the pipe wall 12.

In addition to the above-described components, the cuff forming apparatus includes a heating nozzle 34 which is shown in FIGS. 2, 5 and 7, and is adapted to direct high temperature air against that portion of the outer surface of the pipe wall adjacent the end extending along the outer and inner extruder heads 20, 24, blending roller 28, inner and outer forming rollers 27, 29, and air jets 30, 32. The heating nozzle 34 is itself preferably oriented at approximately the seven o'clock position relative to the pipe wall 12. Those of ordinary skill in the art will recognize that the outer and inner extruder heads 20, 24, blending roller 28, inner and outer forming rollers 27, 29, air jets 30, 32, and heating nozzle 34 of the cuff forming apparatus may each be located in differing orientations relative to the pipe wall 12.

In the cuff forming apparatus, the outer and inner extruder heads 20, 24, blending roller 28, inner and outer forming rollers 27, 29, air jets 30, 32, and heating nozzle 34 are all stationary. In this respect, as will also be discussed in more detail below, the formation of the cuff(s) 14 of the pipe section 10 is accomplished by rotating the pipe wall 12 relative to the stationary components of the cuff forming apparatus. As seen in FIGS. 2 and 4, such rotation is preferably accomplished by a plurality of outer rollers 36 which extend longitudinally along the exterior of the pipe wall 12 and contact the spiral rib 16 thereof, and a plurality of inner rollers 38 which extend longitudinally within the interior of the pipe wall 12 and contact the inner surface thereof. The outer and inner rollers 36, 38 are concurrently rotated by a drive mechanism (not shown) which facilitates the slow rotation of the pipe wall 12. Due to the preferred locations of the stationary components of the cuff forming apparatus, the pipe wall 12 is rotated in a counter-clockwise direction by the outer and inner rollers 36, 38.

Figure 6:
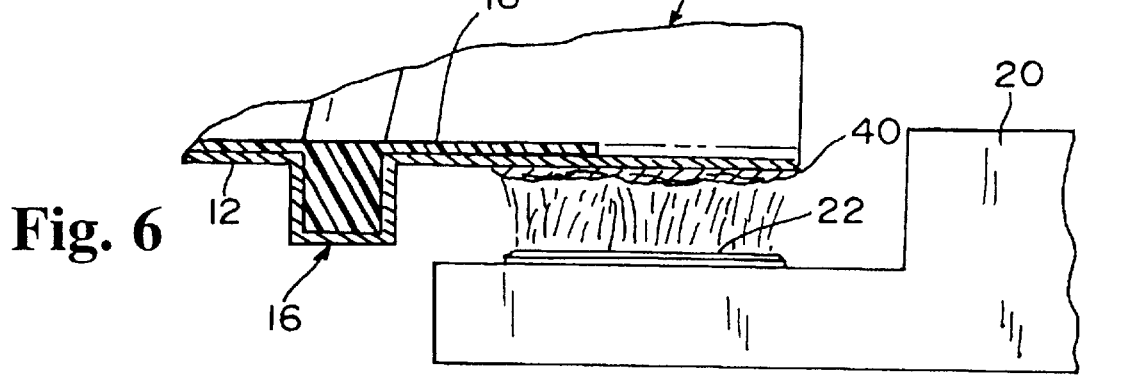
FIGS. 6–10 illustrate the sequence of steps used to form the cuff on the pipe of the present invention using the apparatus shown in FIGS. 2 and 5.

Referring now to FIG. 6, each cuff 14 is formed by initially pre-heating the portion of the outer surface of the pipe wall 12 adjacent the end thereof extending along the components of the cuff forming apparatus. Such pre-heating is facilitated by the activation of the heating nozzle 34, and the rotation of the pipe wall 12 so as to expose the entire periphery of such outer surface portion to the hot air generated by the heating nozzle 34. Subsequent to such pre-heating of the outer surface portion, the outer extruder head 20 is activated so as to apply an initial sub-layer 40 of polymer material thereto in the manner shown in FIG. 6. In this respect, the polymer material is dispensed from the outflow opening 22 of the outer extruder head 20 and onto the outer surface portion of the pipe wall 12, with the initial sub-layer 40 extending to the edge of the pipe wall 12 defining the end thereof. As the initial sub-layer 40 is applied to the outer surface portion of the pipe wall 12 via the outer extruder head 20, such sub-layer 40 is impinged in succession by the three (3) high pressure air streams generated by respective ones of the air jets 30. The exposure of the initial sub-layer 40 to these successive air streams facilitates the spreading of the initial sub-layer 40 over and the adhesion thereof to the outer surface portion of the pipe wall 12. Such spreading insures that the initial sub-layer 40 will be extended to the end of the pipe wall 12.

Referring now to FIG. 7, in addition to the initial sub-layer 40 being spread over and adhered to the outer surface portion of the pipe wall 12 by the air jets 30, a portion thereof is also blown over the end of the pipe wall 12. This wrapping of the initial sub-layer 40 is facilitated by the successive impingement thereagainst of the high pressure air streams generated by respective ones of the air jets 32. In this respect, the air jets 32 effectively cause a portion of the initial sub-layer 40 to be wrapped over and cover the edge of the pipe wall 12 defining the end thereof. As will be recognized, the application of the initial sub-layer 40 to the outer surface portion of the pipe wall 12 is completed upon the counter-clockwise rotation of the pipe wall 12 a full 360 degrees.

Figure 8:
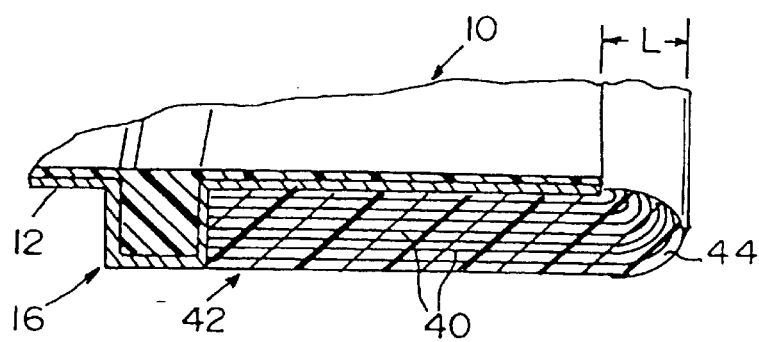

Referring now to FIG. 8, the process previously described in relation to FIGS. 6 and 7 is preferably repeated such that additional sub-layers 40 are applied to the initial sub-layer 40 in succession, with each successively applied sub-layer 40 covering the previously applied sub-layer 40. As seen in FIG. 7, during the application of the multiple sub-layers 40 to the outer surface portion of the pipe wall 12, the heating nozzle 34 remains activated so that each sub-layer 40 is heated prior to the application of a successive sub-layer 40 thereto. Such heating enhances the adhesion of the successively applied sub-layer 40 to the previously applied sub-layer 40.

As will be recognized, each successively applied sub-layer 40 is also spread over and adhered to the previously applied sub-layer 40 by the air jets 30. Additionally, a portion of each successively applied sub-layer 40 is blown by the air jets 30 over that portion of the previously applied sub-layer 40 extending over the edge of the pipe wall 12 defining the end thereof. As seen in FIG. 8, the successively applied sub-layers 40 collectively define an outer layer 42 of the cuff 14. Additionally, those portions of the sub-layers 40 blown over the end of the pipe wall 12 by the air jets 32 collectively define a bull nose 44 of the outer layer 42 which protrudes beyond the edge of the pipe wall 12 defining the end thereof. Those of ordinary skill in the art will recognize that the number of sub-layers 40 included in the outer layer 42 may vary, with the typical range being two (2) to ten (10) sub-layers 40 and eight (8) sub-layers 40 being shown only for purposes of illustration. In this respect, the thickness of the outer layer 42 may be varied according to the number of sub-layers 40 used to form the same. As such, the outer diameter of the cuff 14 may be selectively increased or decreased by varying the number of sub-layers 40 included in the outer layer 42.

As seen in FIGS. 8–10, in the preferred embodiment, the number of sub-layers 40 included in the outer layer 42 is selected such that the outer surface of the completely formed outer layer 42 is substantially flush with the outermost surface of the spiral rib 16. The outer layer 42 is made flush with the spiral rib 16 by the outer forming rollers 29 of the cuff forming apparatus. The outer forming rollers 29, in addition to making the outer surface of the outer layer 42 generally smooth, also forms the same with a substantially uniform outer diameter which, as previously indicated, is preferably sized such that the outer layer 42 is substantially flush with the outermost surface of the spiral rib 16.

As further seen in FIG. 8, in the cuff 14, the bull nose 44 preferably extends a length L in the range of approximately 0.0625 to 1.0 inches beyond the end of the pipe wall 12. The preferred width of the outer layer 42 (excluding the bull nose 44) is preferably in the range of approximately 1.0 to 12.0 inches. As such, the total width of the outer layer 42 (including the bull nose 44) is preferably in the range of about 1.0625 to 13.0 inches.

Referring now to FIG. 9, subsequent to the application of the outer layer 42 (including the bull nose 44) to the outer surface portion of the pipe wall 12, the inner extruder head 24 is activated so as to facilitate the application of an inner layer 46 of polymer material to the inner surface portion of the pipe wall 12 adjacent the end thereof extending along the components of the cuff forming apparatus. In addition to being applied to this inner surface portion of the pipe wall 12, the inner layer 46 is also applied to a portion of the bull nose 44 of the outer layer 42. In the preferred embodiment, the inner layer 46 comprises a single layer of polymer material applied to the inner surface portion of the pipe wall 12 and the bull nose 44 via the outflow opening 26 of the inner extruder head 24 during one complete rotation of the pipe wall 12.

Referring now to FIG. 10, subsequent to being applied to the inner surface portion of the pipe wall 12 and the bull nose 44 by the inner extruder head 24, the inner layer 46 of polymer material is spread out over the pipe wall 12 and bull nose 44 by the inner forming roller 27. Thereafter, the inner layer 46 is "blended" into the bull nose 44 and inner surface portion of the pipe wall 12 by the rolling engagement of the blending roller 28 thereagainst. In this respect, the blending roller 28 shapes the inner layer 46 such that it becomes an integral portion of the bull nose 44, and creates a smooth transition between the bull nose 44 and the inner surface of the pipe wall 12. The outer and inner layers 42, 46, when blended to each other in the aforementioned manner, collectively define the cuff 14. The complete cuff 14 includes a bull nose 45 which, though primarily comprising the bull nose 44 of the outer layer 42, also includes that portion of the inner layer 46 blended into the bull nose 44. The blending of the inner layer 46 into the bull nose 44 does not increase the distance the bull nose 44 protrudes beyond the end of the pipe wall 12. As such, the length of protrusion of the bull nose 45 of the cuff 14 from the end of the pipe wall 12 is the same as the length L of protrusion of the bull nose 44 of the outer layer 42 therefrom which, as indicated above, is preferably about 1.0 inches.

The preferred thickness of the inner layer 46 subsequent to being blended into the outer layer 42 by the blending roller 28 is in the range of about 0.01 to 0.2 inches, and preferably about 0.0625 inches. Additionally, the preferred width of the inner layer 46 (excluding that portion blended into the bull nose 44) is in the range of approximately 0.1 to 2.0 inches. The total width of the inner layer 46 (including that portion blended into the bull nose 44) is preferably about 1.75 inches. The preferred polymer material for both the outer and inner layers 42, 46 is polyethylene, though other materials possessing similar corrosion and abrasion resistance characteristics may be employed as an alternative to polyethylene.

Referring now to FIGS. 13–15, subsequent to a cuff 14 being formed on either one or both ends of the pipe wall 12, each cuff 14 is preferably machined to provide it with a substantially uniform diameter, and to further provide the bull nose 45 thereof with a substantially flat abutment shoulder 48 at its outermost end. The cuffs 14 on corresponding ends of adjacent pipe sections 10 may be joined to each other through the use of an external fastening device such as a coupling band 50 as shown in FIGS. 13 and 15. The coupling band 50 includes an inner gasket member 52 which is preferably fabricated from neoprene. Although not by way of limitation, the gasket member 52 may include a continuous shoulder 54 which extends radially inward from the approximate center thereof and has a generally trapezoidal cross-sectional configuration. When the coupling band 50 is employed to join the pipe sections 10 to each other, the shoulder 54 is extended between the cuffs 14, and in particular the abutment shoulders 48 thereof. However, those of ordinary skill in the art will recognize that the shoulder 54 is optional to the claimed invention.

In addition to the gasket member 52, the coupling band 50 includes an outer strap 56 which extends about and covers the gasket member 52. As seen in FIG. 15, the opposed ends of the outer strap 56 are drawn toward each other through the use of a pair of fastening members 58 such as bolts. The drawing of the opposed ends of the outer strap 56 toward each other facilitates the compression of the coupling band 50 about the cuffs 14, and hence the firm engagement of the coupling band 50 to the adjacent pipe sections 10. Such constriction of the coupling band 50 facilitates the compression of the gasket member 52 between the outer strap 56 and the cuffs 14, which effectively creates a fluid-tight seal between the adjacent pipe sections 10.

The cuffs 14 may also be joined directly to each other, with the firm engagement of the abutment shoulders 48 against each other facilitating the formation of a fluid-tight seal therebetween. The integrity of such seal is increased by providing the cuffs 14 with a substantially uniform diameter which maximizes the contact between the abutment shoulders 48 thereof. As such, the cuffs 14 compensate for pipe walls 12 which may be out of round (i.e., of non-uniform diameter).

Figure 12:
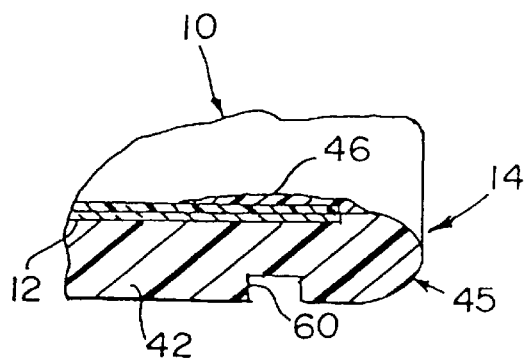
FIG. 12 is a partial cross-sectional view of the cuff of the pipe of the present invention, further illustrating the optional inclusion of an O-ring groove therein.

The firm engagement between the abutment shoulders 48 is typically maintained by joining the cuffs 14 to each other through the use of a sonic weld or a heat weld. Such engagement may also be maintained through the use of a coupling band which may be similar to the coupling band 50 but would not include a structure analogous to the shoulder 54 thereof. In addition or as an alternative to the abutment shoulder 48, each cuff 14 may include an O-ring groove 60 as shown in FIG. 12 for accommodating an O-ring. The O-ring groove 60 is preferably machined into the cuff 14 and is employed in the event the pipe section 10 is to joined to an adjacent pipe section 10 through a bell and spigot connection. As will be recognized, any one of variety of fastening or coupling techniques may be employed in relation to the cuffs 14 on the corresponding ends of the adjacent pipe sections 10.

Figure 11:
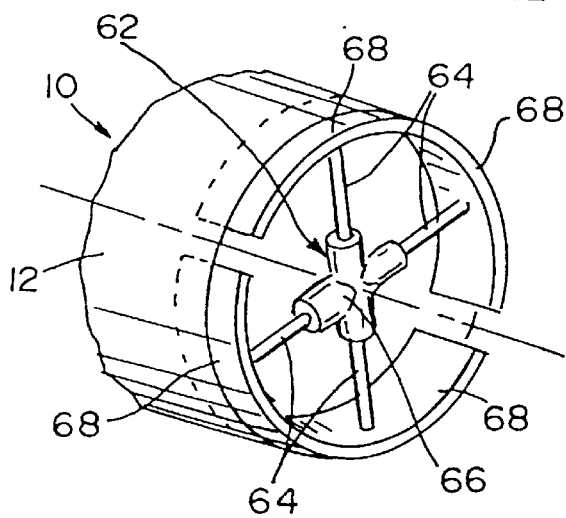
FIG. 11 is a partial perspective view of a hydraulic ram which may be used in conjunction with the pipe of the present invention prior to the formation of the cuff thereon.

Referring now to FIG. 11, in the cuff forming method of the present invention, prior to the application of the outer layer 42 to the pipe wall 12 in the above-described manner, a hydraulic jack 62 is preferably inserted into the interior of the pipe wall 12. The hydraulic jack 62 has four (4) or more arms 64 which extend outwardly from a central hub 66 and are separated by intervals of approximately 90 degrees. Attached to the distal end of the each of the arms 64 is an arcuately contoured pressure plate 68. The pressure plates 68, which are identically configured, are formed such that the curvature of the outer surfaces thereof corresponds to the curvature of the inner surface of the pipe wall 12. The hydraulic jack 62 is used to apply radially outwardly directed pressure to the inner surface of the pipe wall 12 so as to make the same as close to round as possible when the cuff 14 is formed thereon.

Referring now to FIG. 16, the cuff(s) 14 of the present invention may be formed on pipe sections 10 wherein the pipe wall 12 thereof includes a spiral rib 16a formed thereon having a generally trapezoidal cross-sectional configuration rather than a generally square cross-sectional configuration. Advantageously, when the pipe wall 12 is provided with the alternative spiral rib 16a, the trapezoidal configuration of the spiral rib 16a effectively locks the outer layer 42 of the cuff 14 to the pipe wall 12. In this respect, the outer layer 42, and in particular the end thereof disposed furthest from the bull nose 45, is prevented from lifting off of the outer surface of the pipe wall 12 by the outer end of the spiral rib 16a.

As previously indicated, since the cuffs 14 are preferably formed to be of substantially uniform diameter and thus compensate for instances wherein the pipe walls 12 are out of round, the cuffs 14 allow virtually every conventional pipe coupling technique to be employed in relation to the attachment of the adjacent pipe sections 10 to each other. In addition to defining ends of uniform outer diameter for the pipe sections 10, the cuffs 14 also provide additional rigidity thereto. In this respect, the combination of the spiral rib 16, 16a and cuffs 14 provides the pipe sections 10 with a level of structural rigidity exceeding that of other prior art metal pipe adapted for similar uses.

For certain applications, the pipe wall 12 of the pipe section 10 may be deformed for purposes of manipulating the flow characteristics of a fluid therethrough and/or increasing the structural strength thereof. In particular, the pipe wall 12 may be deformed so as to assume any one of a wide variety of cross-sectional configurations, including an arched, triangular, ellipse, or oval configuration. Importantly, the pipe wall 12 may be deformed to assume any one of these configurations subsequent to the formation of the cuffs 14 thereon since the cuffs 14 do not pull away from the pipe wall 12 during the deformation process. As such, the cuffs 14 substantially assume the same deformed configuration as the pipe wall 12, and provide improved coupling between the adjacent pipe sections 10.

Additional modifications and improvements of the present invention may also be apparent to those of ordinary skill in the art. Thus, the particular combination of parts and steps described and illustrated herein is intended to represent only one embodiment of the present invention, and is not intended to serve as limitations of alternative devices within the spirit and scope of the invention.

What is claimed is:

1. A method of forming a cuff on a section of tubular pipe which defines first and second ends and inner and outer surfaces, said method comprising the steps of:
   (a) applying an outer layer of polymer material to a portion of the outer surface of the pipe such that a portion of said outer layer extends beyond and covers the first end of the pipe;
   (b) applying an inner layer of polymer material to a portion of the inner surface of the pipe; and
   (c) blending the inner layer into the outer layer so as to define a bull nose of the cuff which extends beyond the first end of the pipe.

2. The method of claim 1 wherein step (a) comprises forming the outer layer from multiple sub-layers which are applied to the outer surface of the pipe in succession such that each successively applied sub-layer covers the previously applied sub-layer.

3. The method of claim 2 wherein step (a) comprises applying from two to ten sub-layers to the outer surface of the pipe.

4. The method of claim 2 wherein step (a) comprises heating each sub-layer prior to the application of a successive sub-layer thereto.

5. The method of claim 1 wherein step (a) comprises pre-heating the pipe prior to the application of the outer layer to the outer surface.

6. The method of claim 1 wherein step (a) comprises using at least one air jet to blow the outer layer over the first end of the pipe.

7. The method of claim 1 wherein step (a) comprises using at least one air jet to spread the outer layer over the outer surface of the pipe and adhere the outer layer thereto.

8. The method of claim 1 wherein step (a) comprises using at least one outer forming roller to form the outer layer with a generally smooth outer surface of substantially uniform diameter.

9. The method of claim 1 wherein the pipe includes a spiral rib extending from the outer surface thereof, and step (a) comprises applying the outer layer to the outer surface of the pipe at a thickness wherein the outer layer protrudes beyond the spiral rib.

10. The method of claim 1 wherein steps (a) and (b) comprise applying the outer and inner layers of polymer material to the outer and inner surfaces of the pipe via respective ones of a pair of extruder heads.

11. The method of claim 1 wherein steps (a), (b), and (c) are carried out during the rotation of the pipe.

12. The method of claim 1 wherein step (b) comprises applying the inner layer to the inner surface of the pipe and the portion of the outer layer extending beyond the first end of the pipe.

13. The method of claim 12 wherein step (b) further comprises using at least one inner forming roller to spread the inner layer over the inner surface and the outer layer.

14. The method of claim 1 wherein step (c) comprises blending the inner layer into the outer layer through the use of a blending roller.

15. The method of claim 1 wherein steps (a), (b), and (c) are carried out on the first and second ends of the pipe.

16. The method of claim 1 further comprising the step of:
(d) machining the cuff to provide the cuff with a substantially uniform diameter.

17. The method of claim 16 wherein step (d) comprises machining the bull nose of the cuff to provide the bull nose with a substantially flat abutment shoulder.

18. The method of claim 16 wherein step (d) comprises machining an O-ring groove into the cuff.

19. The method of claim 1 wherein steps (a) and (b) comprise applying outer and inner layers of polyethylene to the outer and inner surfaces of the pipe.

20. The method of claim 1 wherein step (a) comprises inserting a jack into the pipe to apply radially outwardly directed pressure to the inner surface prior to the application of the outer layer to the outer surface.

* * * * *